(12) United States Patent
Li (10) Patent No.: US 11,548,133 B2
(45) Date of Patent: Jan. 10, 2023

(54) HANDHELD POWER TOOL (71) Applicant: Globe (Jiangsu) Co., Ltd, Jiangsu (CN)

(72) Inventor: Xiazi Li, Jiangsu (CN)

(73) Assignee: Globe (Jiangsu) Co., Ltd, Changzhou (CN)

( * ) Notice: Subject to any disclaimer, the term of this patent is extended or adjusted under 35 U.S.C. 154(b) by 233 days.

(21) Appl. No.: 17/038,023

(22) Filed: Sep. 30, 2020

(65) Prior Publication Data
US 2021/0107129 A1 Apr. 15, 2021

(30) Foreign Application Priority Data

Oct. 9, 2019 (CN) .......................... 201910953789.5
Oct. 9, 2019 (CN) .......................... 201910954170.6

(51) Int. Cl.
*B25F 5/00* (2006.01)
*A01G 3/053* (2006.01)
*A01G 3/08* (2006.01)
*B27B 17/00* (2006.01)

(52) U.S. Cl.
CPC .............. *B25F 5/008* (2013.01); *A01G 3/053* (2013.01); *A01G 3/086* (2013.01); *B27B 17/00* (2013.01)

(58) Field of Classification Search
CPC ......... B25F 5/008; A01G 3/053; A01G 3/086; B27B 17/00
USPC .......................................................... 173/73
See application file for complete search history.

(56) References Cited

U.S. PATENT DOCUMENTS

| 2,660,847 | A | * | 12/1953 | Britten | A01D 34/84 403/256 |
| 4,242,794 | A | * | 1/1981 | Peterson | E01H 1/0809 15/328 |
| 5,950,578 | A | * | 9/1999 | Hirano | F02F 1/32 123/41.7 |
| 6,836,036 | B2 | * | 12/2004 | Dube | H02K 9/22 310/67 R |
| 7,320,384 | B2 | * | 1/2008 | Huang | F16H 57/0434 184/11.1 |
| 7,646,118 | B2 | * | 1/2010 | Yoshida | H02K 9/227 310/60 R |

(Continued)

OTHER PUBLICATIONS

Search Report of Counterpart European Patent Application No. 20200900.7 dated Feb. 23, 2021.

*Primary Examiner* — Thomas M Wittenschlaeger
*Assistant Examiner* — David G Shutty (57) ABSTRACT

The invention provides a handheld power tool, which comprises a handle assembly, a power mechanism connected with the handle assembly, and a working mechanism connected with the power mechanism. The power mechanism comprises a main housing, an inner housing, and a motor disposed in the inner housing. The main housing comprises a first air inlet at a side wall thereof, the inner housing comprises an opening. An airflow channel is located between the main housing and the inner housing, and in communication with the first air inlet, the opening and an inside of the inner housing. The handheld power tool of the present invention not only has good heat dissipation effect, but also has waterproof and dustproof effects, and can work in rainy days and humid areas without affecting the performance of the whole machine.

12 Claims, 8 Drawing Sheets

(56) References Cited

U.S. PATENT DOCUMENTS

| | | | | |
|---|---|---|---|---|
| 8,123,596 | B2* | 2/2012 | Kobayashi | B25F 5/008 |
| | | | | 451/344 |
| 8,573,323 | B2* | 11/2013 | Muller | B25F 5/008 |
| | | | | 173/171 |
| 9,467,030 | B2* | 10/2016 | Camilleri | B25F 5/008 |
| 9,517,555 | B2* | 12/2016 | Racov | A01D 34/90 |
| 10,044,245 | B2* | 8/2018 | Bekavac | H02K 7/145 |
| 11,040,439 | B2* | 6/2021 | Walker | B25F 5/00 |
| 2007/0220847 | A1* | 9/2007 | Notaras | F02M 35/08 |
| | | | | 55/385.3 |
| 2008/0302551 | A1* | 12/2008 | Komuro | B25F 5/008 |
| | | | | 173/217 |
| 2010/0218385 | A1* | 9/2010 | Mang | B25F 5/008 |
| | | | | 30/298 |
| 2011/0148227 | A1* | 6/2011 | Schuele | B25F 5/008 |
| | | | | 310/50 |
| 2013/0270933 | A1* | 10/2013 | Kraetzig | A01D 34/90 |
| | | | | 310/227 |
| 2015/0336232 | A1* | 11/2015 | Bergquist | B23Q 11/127 |
| | | | | 173/1 |
| 2016/0258351 | A1* | 9/2016 | Nakaganna | B23D 45/16 |
| 2016/0330914 | A1* | 11/2016 | Tang | A01G 3/053 |
| 2017/0071134 | A1* | 3/2017 | Li | B25F 5/02 |
| 2018/0139907 | A1 | 5/2018 | Li et al. | |
| 2019/0160622 | A1* | 5/2019 | Barth | B24B 55/10 |
| 2019/0305640 | A1* | 10/2019 | Duernegger | B25F 5/008 |
| 2020/0196533 | A1* | 6/2020 | Wu | A01G 3/053 |
| 2021/0299844 | A1* | 9/2021 | Alexandersson | A01G 3/053 |
| 2022/0118589 | A1* | 4/2022 | Takahagi | B25F 5/008 |

* cited by examiner

FIG. 14

# HANDHELD POWER TOOL

CROSS-REFERENCE TO RELATED INVENTIONS

This invention is a US invention which claims the priority of CN invention Serial No. 201910954170.6 and Serial No. 201910953789.5, both filed on Oct. 9, 2019, the disclosures of which are hereby incorporated by reference in their entirety.

TECHNICAL FIELD

The invention relates to a garden tool, in particular to a handheld power tool.

BACKGROUND ART

The handheld power tool, such as the electric hedge trimmer or the chain saw, is a cutting tool in garden, which is used for trimming various outdoor plants such as bushes, hedges and green plants. The handheld power tool is prone to generate a lot of heat during use and is not suitable for long-term continuous work. To this end, a special ventilation structure is required to dissipate heats from the motor, gear box and PCB of the handheld power tool. In addition, sometimes workers would use the handheld power tool in rainy and humid areas in order to rush the work. When the handheld power tool works in the rainy weather or the handheld power tool is used in a humid area, the water is easy to enter the inside of the machine through the ventilation structure, causing short circuit or burning of the PCB, motor and other parts, thus affecting the work progress and increasing the cost. Because wood chips and dust are often generated when the handheld power tool is in operation, and they may enter into the inside of the handheld power tool through the ventilation structure, which will affect the operation of the motor.

In view of this, it is indeed necessary to improve the existing handheld power tool in order to solve the above problems.

SUMMARY OF INVENTION

The object of the present invention is to provide a handheld power tool, which not only has better heat dissipation effect, but also has waterproof and dust-proof effect. The handheld power tool can work in rainy days and humid areas without affecting the performance of the whole machine.

To achieve the above object, the present invention provides a handheld power tool, comprising: a handle assembly; a power mechanism connected with the handle assembly; and a working mechanism connected to the power mechanism; the power mechanism comprises a main housing, an inner housing and a motor disposed in the inner housing, the main housing comprises a first air inlet at a side wall thereof, the inner housing comprises an opening. An airflow channel is located between the main housing and the inner housing, and in communication with the first air inlet, the opening and an inside of the inner housing.

As a further improvement of the present invention, the opening is disposed at the top or bottom of the inner housing.

As a further improvement of the present invention, a first fan is disposed on the top of the motor. The first fan is coaxially sleeved on an output shaft of the motor, and the motor is an external rotor motor and the first fan is an axial fan.

As a further improvement of the present invention, the main housing comprises a top cover located above the motor, and the first air inlet is disposed at the top of the top cover.

As a further improvement of the present invention, the inner housing is disposed below the top cover, the top cover comprises an extension wall extending downward from the inner side of the top cover, and the extension wall is arranged between the first air inlet and the inner housing.

As a further improvement of the present invention, a filter is disposed in the air flow channel, and the filter is disposed upstream of the opening of the inner housing for filtering dust and/or water vapor in the airflow.

As a further improvement of the present invention, the main housing comprises a bracket disposed below the top cover, a second air inlet is arranged at the bottom of the bracket, and the second air inlet communicates with the first air inlet in an extending direction of the output shaft of the motor.

As a further improvement of the present invention, the power mechanism comprises a power transmission assembly installed below the bracket, the power transmission assembly comprises a bottom cover installed at the bottom of the bracket and a second fan received in the bottom cover, the bottom cover comprises a blower chamber full surrounding the second fan. A heat dissipation channel is arranged at the bottom of the blower chamber and opens into the exterior of the main housing.

As a further improvement of the present invention, the second fan is connected to an output shaft of the motor. A ventilation hole is arranged at the bottom of the bracket for communicating the inner housing with the blower chamber.

As a further improvement of the present invention, at least two heat dissipation fins are arranged on the side of the bottom cover close to the blade assembly. A heat dissipation passage is arranged between two adjacent heat dissipation fins. The blower chamber is fully surrounded by two heat dissipation fins. One end of the heat dissipation passage communicates with the blower chamber and the other end communicates with the exterior of the main housing.

As a further improvement of the present invention, the heat dissipation channel is arranged at an end of the bottom cover opposite to the blade assembly. A third air inlet is arranged at the bottom of the blower chamber.

As a further improvement of the present invention, the heat dissipation channel extends in the width direction of the bottom cover. The third air inlet extends in the length direction of the bottom cover.

As a further improvement of the present invention, the power mechanism comprises a circuit board electrically connected to the motor. The circuit board is arranged below the top cover and on the same side of the main housing as the first air inlet.

As a further improvement of the present invention, the handheld power tool may be a hedge trimmer or a chainsaw.

As a further improvement of the present invention, the second fan may be a centrifugal fan.

The beneficial effect of the present invention is that the handheld power tool of the present invention includes a first air inlet at the main housing and an opening at the inner housing, so that external air can enter the motor room through the first air inlet, and then enters the inside of the motor through the opening. Thereby, the handheld power tool of the present invention not only has a better heat dissipation effect, but also has waterproof and dust-proof effects. The handheld power tool can work in rainy days and humid areas without affecting the performance of the whole machine.

DESCRIPTION OF EMBODIMENT

In order to make the objectives, technical solutions, and advantages of the present invention clearer, the following describes the present invention in detail with reference to the accompanying drawings and specific embodiment.

Figure 1:
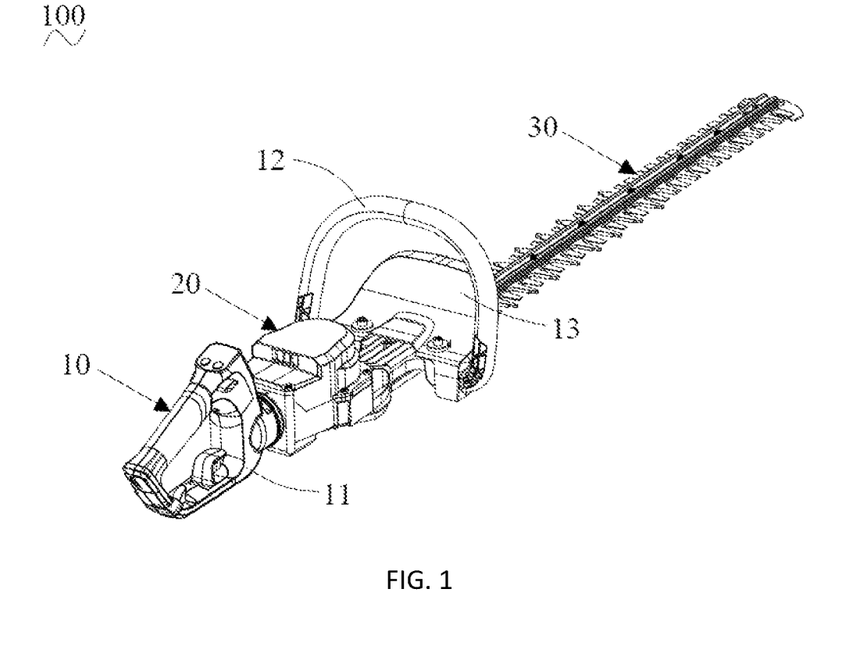
FIG. 1 is a perspective view of a hedge trimmer according to the first embodiment of the present invention.
Figure 2:
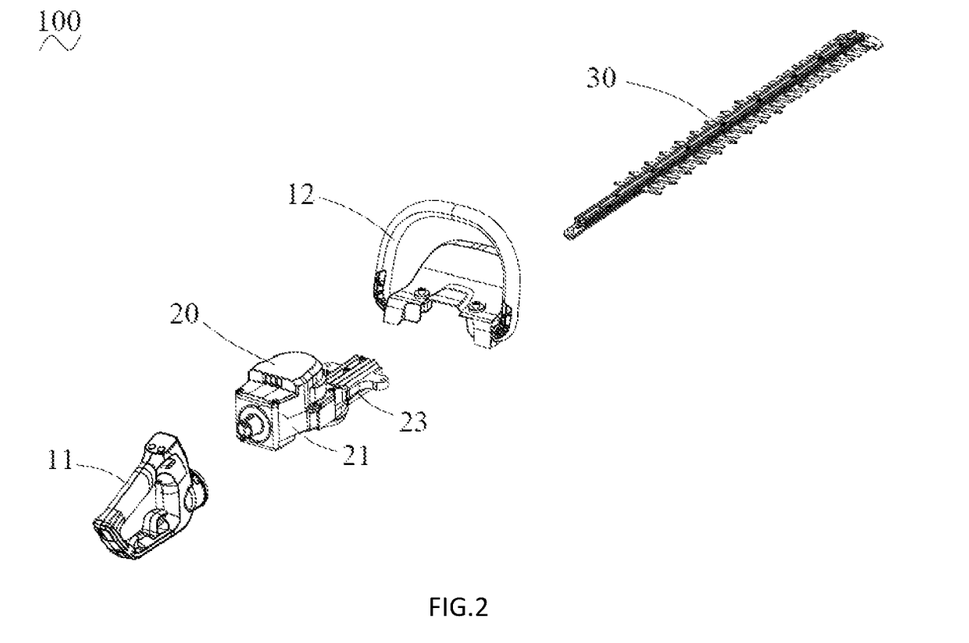
FIG. 2 is an exploded view of the hedge trimmer shown in FIG. 1.

Please refer to FIG. 1 and FIG. 2, the present invention discloses a power tool. A hedge trimmer 100 is taken as an example for description. It is understandable that the power tool comprises grass trimmers, chainsaws, air blowers and the like. The hedge trimmer 100 in the first embodiment of the present invention includes a handle assembly 10, a power mechanism 20 connected with the handle assembly 10, and a working mechanism connected to the power mechanism 20. In this embodiment, the working mechanism is a blade assembly 30, which is used as an example for description.

Figure 3:
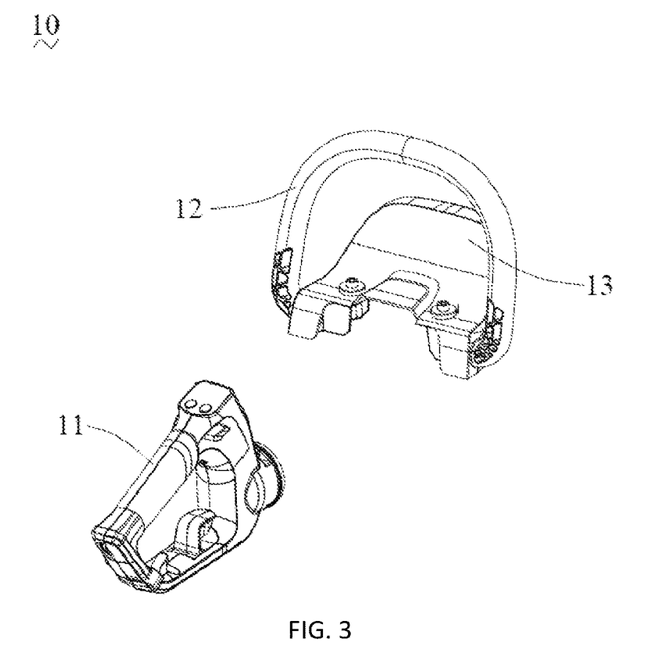
FIG. 3 is an exploded view of the handle assembly in FIG. 2.

Please refer to FIG. 2 and FIG. 3, the handle assembly 10 includes a main handle 11, an auxiliary handle 12, and a protective plate 13. The main handle 11 is a gripable handle structure with a cavity. Switches and the like are all disposed on the main handle 11 for operation. The main handle 11 and the auxiliary handle 12 are respectively arranged at both ends of the power mechanism 20, and the auxiliary handle 12 is disposed near the blade assembly 30, which is convenient for users to hold and start protection safely. The protective plate 13 is integrally arranged with the auxiliary handle 12.

Figure 4:
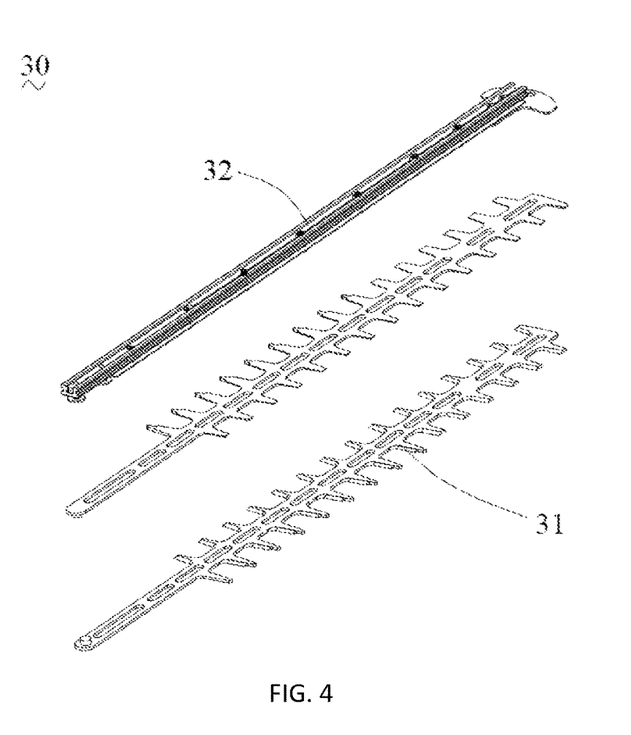
FIG. 4 is an exploded view of the blade assembly in FIG. 2.
Figure 5:
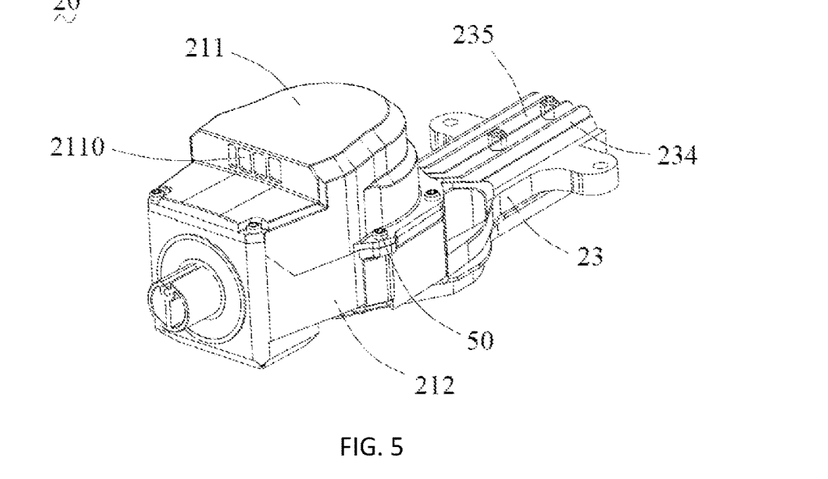
FIG. 5 is a perspective view of the power mechanism in FIG. 2.
Figure 6:
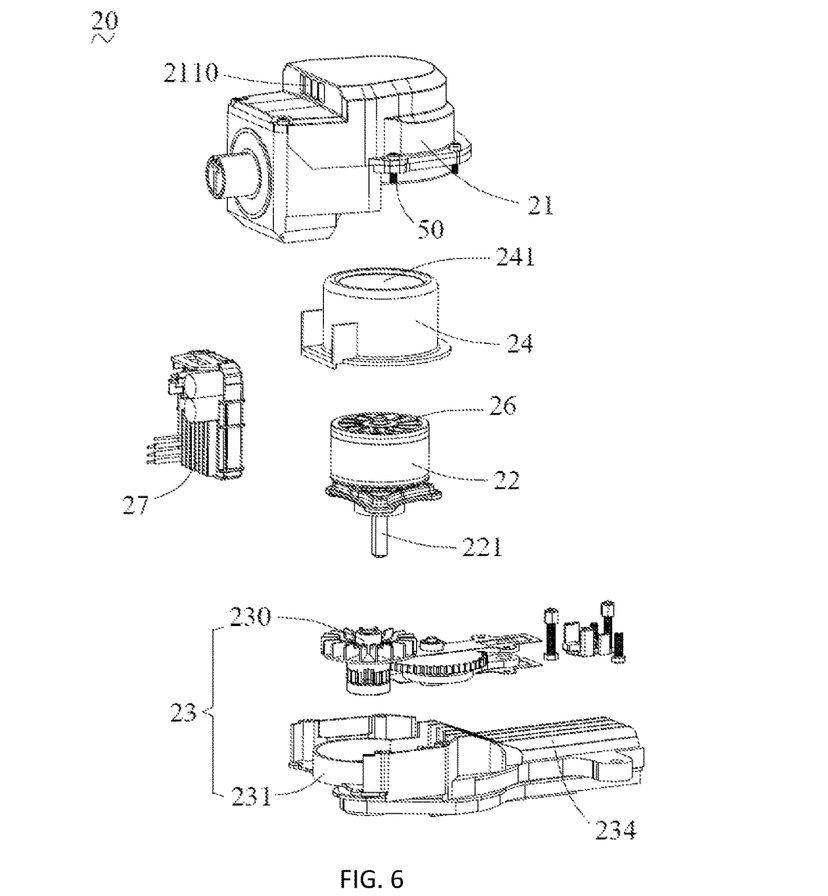
FIG. 6 is a partially exploded view of the power mechanism shown in FIG. 5.

Please refer to FIG. 2 and FIG. 4, the blade assembly 30 includes a pair of cutting blades 31 and a blade supporting member 32. The pair of cutting blades 31 detachably connect with the power mechanism 20. The pair of cutting blades 3 are driven to perform a cutting operation by the power mechanism 20. The blade supporting member 32 is fixedly disposed at a middle position of the cutting blades 31 in a width direction of the blades and is located above the pair of cutting blades 31.

Since the handle assembly 10 and the blade assembly 30 both belong to the existing structure, they will not be described in detail here, and the power mechanism 20 will be described in detail in the following description.

Please refer to FIG. 5 to FIG. 12 in combination with FIG. 2, the power mechanism 20 includes a main housing 21, a motor 22 received in a motor room 210 of the main housing 21, an inner housing 24 covering the motor 22 and a power transmission assembly 23 installed below the main housing 21. The main housing 21 includes a top cover 211 covering the top of the motor 22 and a bracket 212 located below the top cover 211. The motor room 210 is located below the top cover 211 and is defined by the top cover 211 and the inner housing 24 together. In this embodiment, the motor 22 is preferably an external rotor motor.

Figure 7:
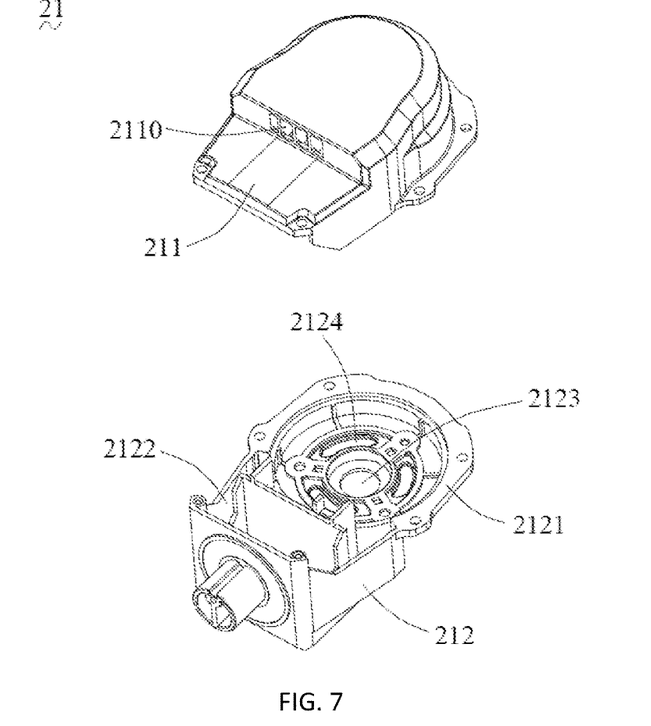
FIG. 7 is an exploded view of the main housing in FIG. 6.
Figure 8:
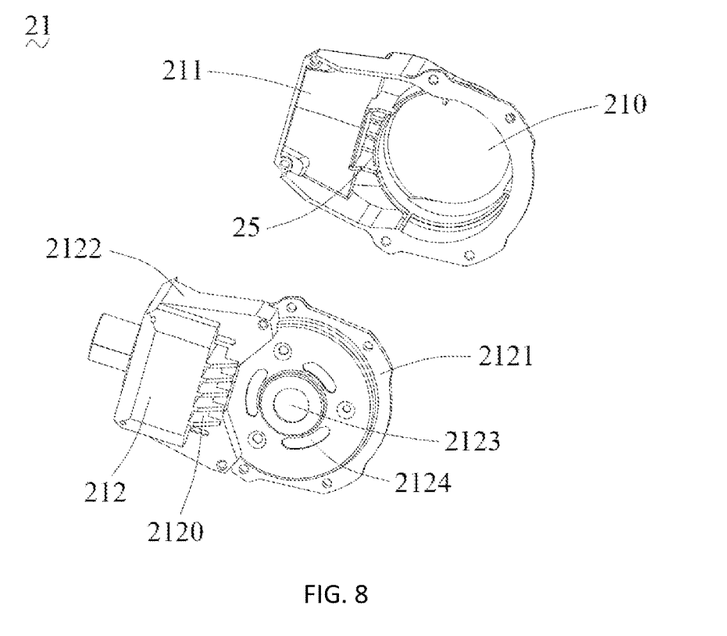
FIG. 8 is another perspective exploded view of the main housing shown in FIG. 7.

The first air inlet 2110 is arranged at the top of the top cover 211, and the first air inlet 2110 is located on the side wall of the main housing 21. Specifically, the first air inlet 2110 is located at the top of the rear wall of the top cover 211, and the rear wall is facing the rear handle 11, so that the outside air can enter inside of the top cover 211 through the first air inlet 2110 in a horizontal direction. Of course, the first air inlet 2110 may also be arranged at the top of the other side walls of the top cover 211, or the first air inlet 2110 is arranged both on the side wall and the rear wall of the top cover 211, which may be determined according to actual conditions and isn't limited here.

Figure 9:
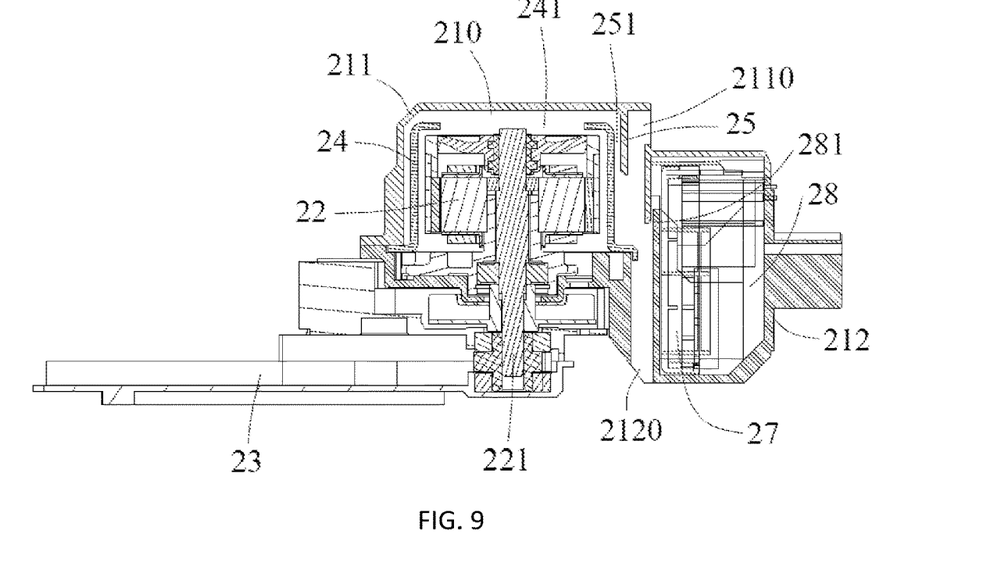
FIG. 9 is a cross-sectional view of the power mechanism shown in FIG. 5.

The inner housing 24 is arranged below the top cover 211 and is located beside the first air inlet 2110. The top cover 211 comprises an extension wall 25 positioned between the first air inlet 2110 and the inner housing 24, and the extension wall 25 extends vertically downward from the inner wall of the top cover 211. Preferably, in this embodiment, the extension wall 25 extends to the middle position of the inner housing 24 and is not in contact with the inner housing 24 in the vertical direction. That is, the extension wall 25 extends vertically downward from the inner wall of the top cover 211 to half the height of the inner housing 24. In this way, an airflow channel 251 is located between the main housing 21 and the inner housing 24, also between the extension wall 25 and the inner housing 24, so that after external air enters through the first air inlet 2110, it will flow into the space (that is, into the motor room 210 defined by the inner housing 24 and the top cover 211 along the airflow channel 251. Of course, the extension height of the extension wall 25 is not limited to this, as long as it can ensure that the extension wall 25 is not in contact with the inner housing 24 so as to arrange an airflow channel 251 between the extension wall 25 and the inner housing 24.

The bracket 212 comprises a second air inlet 2120 at the bottom thereof, and the external air can also flow into the space defined by the inner housing 24 and the top cover 211 through the second air inlet 2120 and the airflow channel 251. In the extending direction of the output shaft 221 of the motor 22, the second air inlet 2120 and the air inlet 2110 communicates with each other and they are arranged up and down correspondingly. In this way, the air intake is increased to improve the ventilation effect of the motor room 210. At the same time, when the external air enters through the first air inlet 2110, the wood chips and dust with large particle size could be discharged from the second air inlet 2120 due to the blocking of the extension wall 25, which has a better dust-proof effect. When the hedge trimmer 100 is in operation in humid weather, the liquid such as rainwater enters through the first air inlet 2110 along with the external air, the liquid could also be discharged from the second air inlet 2120 under the weight of its own gravity and the blocking of the extension wall 25, leading to a better waterproof effect of the hedge trimmer 100.

A filter element (not shown) is disposed in the airflow channel 251, and the filter element is disposed upstream of the first opening 241 of the inner housing 24. The filter element is used for filtering out dust and water vapor with a small particle size when the external air enters into the airflow channel 251 through the first air inlet 2110 and the second air inlet 2120, so as to make the clean and dry air continue to flow into the inner housing 24 along the airflow channel 251.

A first opening 241 is arranged at the top of the inner housing 24. After the external air flows into the first air inlet 2110, it will enter the inside of the inner housing 24 and the motor 22 through the first opening 241. In this embodiment, the inner housing 24 is made of aluminum alloy, the bracket 212 is a magnesium alloy bracket, and the motor 22 is preferably an external rotor motor.

A first fan 26 is arranged on the top of the motor 22, and the first fan 26 is coaxially sleeved on the output shaft 221 of the motor 22. So when the first fan 26 is driven to rotate by the output shaft 221, the external air can enter the motor room 210 from the first air inlet 2110 and the second air inlet 2120, and flows downward along the space between the motor 22 and the inner housing 24 and the inner space of the motor 22 through the first opening 241. Preferably, the first fan 26 is an axial fan. Preferably, the first opening 241 is arranged as wide as the width of the first fan, when seen along a horizontal direction.

As shown in FIG. 9, the driving mechanism further includes a circuit board 27, and the circuit board 27 is electrically connected to the motor 22 for controlling the operation of the motor 22. In this embodiment, the circuit board 27 is disposed under the top cover 211 and located on the same side of the main housing 21 as the first air inlet 2110. With this arrangement, in view of the relationship between the cooling surface area and the installation space, the circuit board 27 can maintain good cooling performance.

The bracket 212 includes a first portion 2121 for mounting the motor 22 and a second portion 2122 for mounting the circuit board 27. The first portion 2121 is substantially disc-shaped, and a through hole 2123 is disposed at the middle position of the first portion 2121 through which the output shaft 221 of the motor 22 passes. Both the bottom of the motor 22 and the inner housing 24 are received in the first portion 2121, and the bottom of the top cover 211 and the first portion 2121 are assembled together by screws 50, which are not limited here. Specifically, the circuit board 27 is vertically inserted into the second portion 2122. In other embodiments, the circuit board 27 can also be arranged in other connection and placement mode, for example, horizontally inserted into the second portion 2122.

A ventilation hole 2124 is arranged at the bottom of the first portion 2121 to communicate the motor room 210 with the power transmission assembly 23. The second portion 2122 is disposed near the main handle 11 and is connected to the main handle 11 so as to receive the circuit board 27. The circuit board 27 is arranged on the second portion 212 of the bracket 212 and is covered by the top cover 211 from the top side. The top cover 211 and the bracket 212 together form a receiving cavity 28 for accommodating the circuit board 27 independent of the motor room 210. This arrangement can protect the circuit board 27 from dust and water. The receiving cavity 28 also comprises a gap 281, which communicates with the first air inlet 2110 and the second air inlet 2120, and can be used to dissipate heat from the circuit board 27, thereby the core components can be protected by the top cover 211 and the bracket 212 and the function of waterproof and dust-proof is obtained.

Figure 10:
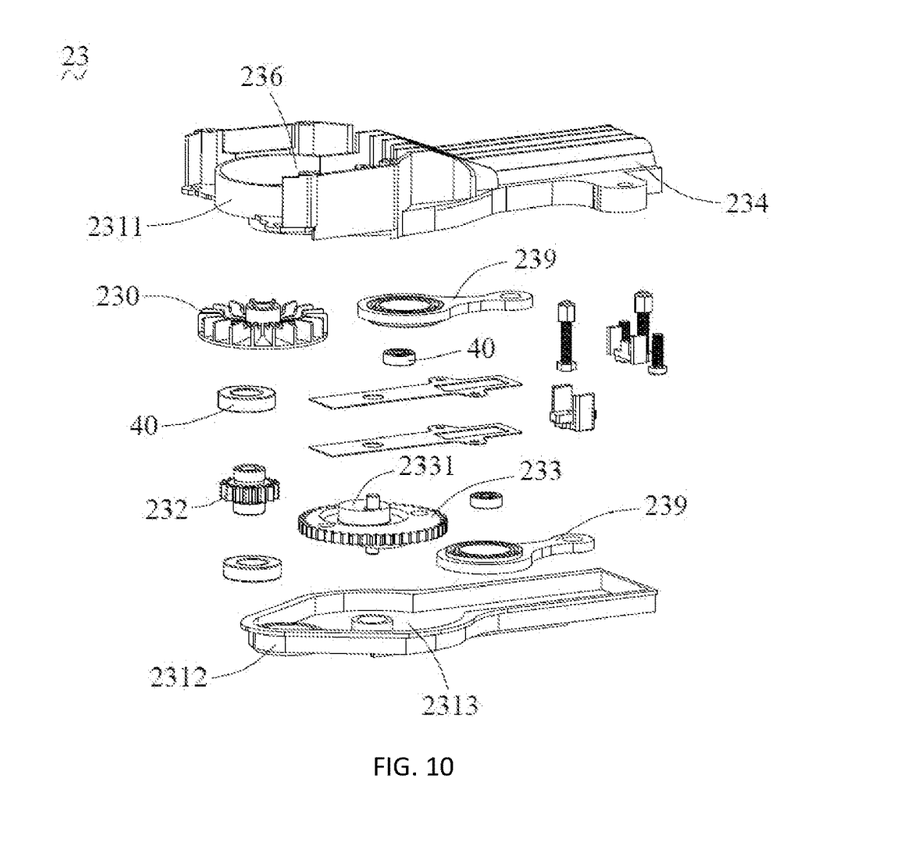
FIG. 10 is an exploded view of the power transmission assembly in FIG. 6.
Figure 11:
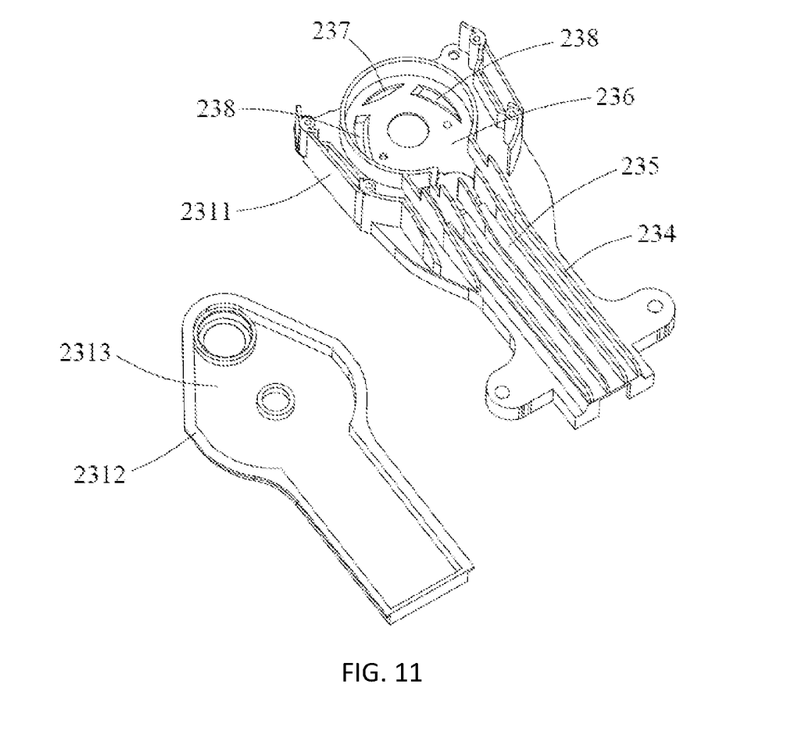
FIG. 11 is an exploded view of the bottom cover in FIG. 10.

The power transmission assembly 23 is installed below the bracket 212. The power transmission assembly 23 includes a bottom cover 231 installed at the bottom of the bracket 212, a second fan 230 received in the bottom cover 231, and a first gear 232 and the second gear 233 engaged with each other installed on the bottom cover. At least two heat dissipation fins 234 are arranged on the bottom cover 232 close to the blade assembly 30. A heat dissipation channel 235 is arranged between two adjacent heat dissipation fins 234.

The second fan 230 is received in the bottom cover 231. A blower chamber 236 that completely covers the second fan 230 is arranged at the side of the bottom cover 231 away from the blade assembly 30 and a heat dissipation hole 237 is located at the bottom of the blower chamber 236 communicating with the outside. The blower chamber 236 may be located between two heat dissipation fins 234 located at the outermost side and arranged in a closed manner. One end of the heat dissipation channel 235 is in communication with the blower chamber 236 and the other end is in communication with the outside.

The second fan 230 is preferably a centrifugal fan. The second fan 230 is connected to the output shaft 221 of the motor 22, and a ventilation hole 2124 located at the bottom of the bracket 212 is used to communicate the inner housing 24 and the blower chamber 236. Thereby, when the second fan 230 rotates, the heat in the motor room 210 can be transferred into the blower chamber 236 through the ventilation hole 2124, and then dissipated through the heat dissipation hole 237 and the heat dissipation channel 235.

The heat dissipation hole 237 is arranged at an end of the bottom cover 231 away from the blade assembly 30, and the heat dissipation hole 237 extends in an arc shape in the width direction of the bottom cover 231. A third air inlet 238 communicating with the exterior of the main housing is arranged at the bottom of the blower chamber 236. The third air inlet 238 also extends in an arc shape in the length direction of the bottom cover 231. When the output shaft 221 of the motor 22 rotates, it can drive the second fan 230 to rotate. And when the second fan 230 rotates, a low-pressure area will be generated nearby. At this time, the third air inlet 238 can supply external cold air into the interior of the main housing, and the inside hot air is discharged through the heat dissipation hole 237, which improves the heat dissipation effect.

In the present invention, the heat dissipation hole 237 and the third air inlet 238 are designed to connect the blower chamber 236 and the outside in the thickness direction of the bottom cover 231, so as to make the heat dissipation better.

The bottom cover 231 includes a first bottom cover 2311 and a second bottom cover 2312 which are assembled together along the up and down direction, and an accommodating cavity 2313 arranged between the first bottom cover 2311 and the second bottom cover 2312. The first gear 232 and the second gear 233 are received in the accommodating cavity 2313. The first gear 232 is coaxially sleeved on the output shaft 221 of the motor 22, and the diameter of the first gear 232 is smaller than the diameter of the second gear 233, so that when the motor 22 rotates, the output shaft 221 drives the first gear 232 to rotate, and then drives the second gear 233 to rotate.

Figure 12:
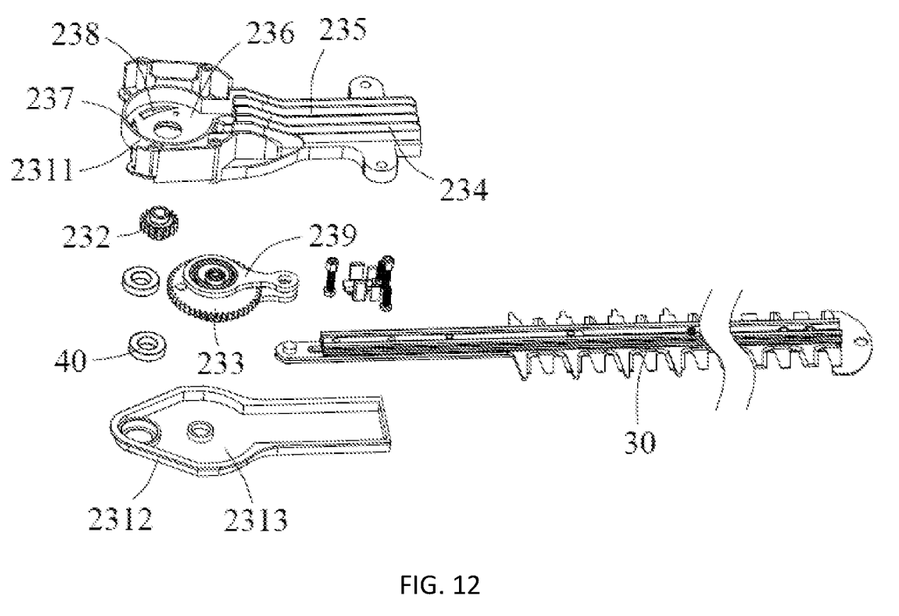
FIG. 12 is an exploded view of the power transmission assembly shown in FIG. 10 when matched with the blade assembly.

Eccentric wheel portions 2331 are respectively arranged at opposite ends of the second gear 233, and in the direction of the central axis of the second gear 233, the central axes of the two eccentric wheel portions 2331 do not overlap. The power transmission assembly 23 further includes two crank rods 239 sleeved on the two eccentric wheel portions 2331. One end of each of the two crank rods 239 is sleeved on the corresponding eccentric wheel portion 2331, and the other end is connected to the blade assembly 30. So when the second gear 233 rotates, the crank rod 239 can be driven to move, and then the blade assembly 30 is moved back and forth to perform a cutting operation. Preferably, one end of the two crank rods 239 connected to the eccentric wheel portion 2331 does not overlap in the center and the other end connected to the blade assembly 30 overlaps at the center, which can achieve the effect of stable power transmission.

In the present invention, the assembling procedure of the first bottom cover 2311 and the second bottom cover 2312 is achieved through the mutual cooperation of screws and screw holes. Of course, in other embodiment, the first bottom cover 2311 and the second bottom cover 2312 can also be assembled together in other ways, which is not limited herein. In addition, it can be understood that the rotational connection between the first gear 232 and the second fan 230, and the rotational connection between the eccentric wheel portion 2331 of the second gear 233 and the crank rod 239 are achieved through the bearing 40. This belongs to the prior art, which is described here in detail.

The blower chamber 236, the heat dissipation fins 234 and the heat dissipation channels 235 are all arranged on a side of the first bottom cover 2311 facing the main housing 21. Specifically, the heat dissipation fin 234 is arranged on the first bottom cover 2311 and is located on the side facing the second fan 230. One end of the heat dissipation passage 235 is in communication with the blower chamber 236 and the other end communicates with the outside. When the motor 22 rotates, the second fan 230 rotates synchronously and drives the air in the accommodating cavity 2313 to be discharged outward along the heat dissipation channel 235. This process will take away the heat on the motor 22, the power transmission assembly 23, and the heat dissipation fin 234, which improves the heat dissipation efficiency of the hedge trimmer 100 of the present invention.

The heat dissipation and dust prevention process of the hedge trimmer 100 of the present invention can be summarized as follows. When the first fan 26 rotates, a suction force is generated, and under the action of the suction force of the first fan 26, external air enters from the first air inlet 2110 and the second air inlet 2120. Due to the blockage of the extension wall 25, wood particles, dust, and rain with larger particle sizes will be discharged from the second air inlet 2120, while dust and water vapor with smaller particle sizes will be filtered by the filter. So clean and dry air continues flow into interior of the main housing 21 along the airflow channel 251. When outside air enters the inside of the top cover 211, it will enter through the first opening 241 and flow down along the space between the motor 22 and the inner housing 24 and the internal space of the motor 22. The second fan 230 will also generate suction force during rotation, and under the suction of the second fan 230, the heat in the motor room 210 will dissipate into the blower chamber 236 through the ventilation hole 2124 at the bottom of the bracket 212, and then pass through the heat dissipation hole 237 and the heat dissipation channel 235 to dissipate outside of the main housing 21. Compared with the prior art, the hedge trimmer 100 of the present invention not only has better heat dissipation effect, but also has waterproof and dust-proof effects.

In summary, the hedge trimmer 100 of the present invention includes the first air inlet 2110 on the side wall of the main housing 21 and the first opening 241 on the top of the inner housing 24. The airflow channel 251 is arranged between the main housing 21 and the inner housing 24, and the first air inlet 2110, the airflow channel 251, and the first opening 241 communicate with the inside of the inner housing 24. The outside air can enter the motor room 210 through the first air inlet 2110 and the airflow channel 251, and enters the inside of the motor 22 through the first opening 241, which not only has a better heat dissipation effect, but also has a better waterproof and dust-proof effect. The hedge trimmer can work in rainy days and humid areas without affecting the performance of the whole machine.

Figure 13:
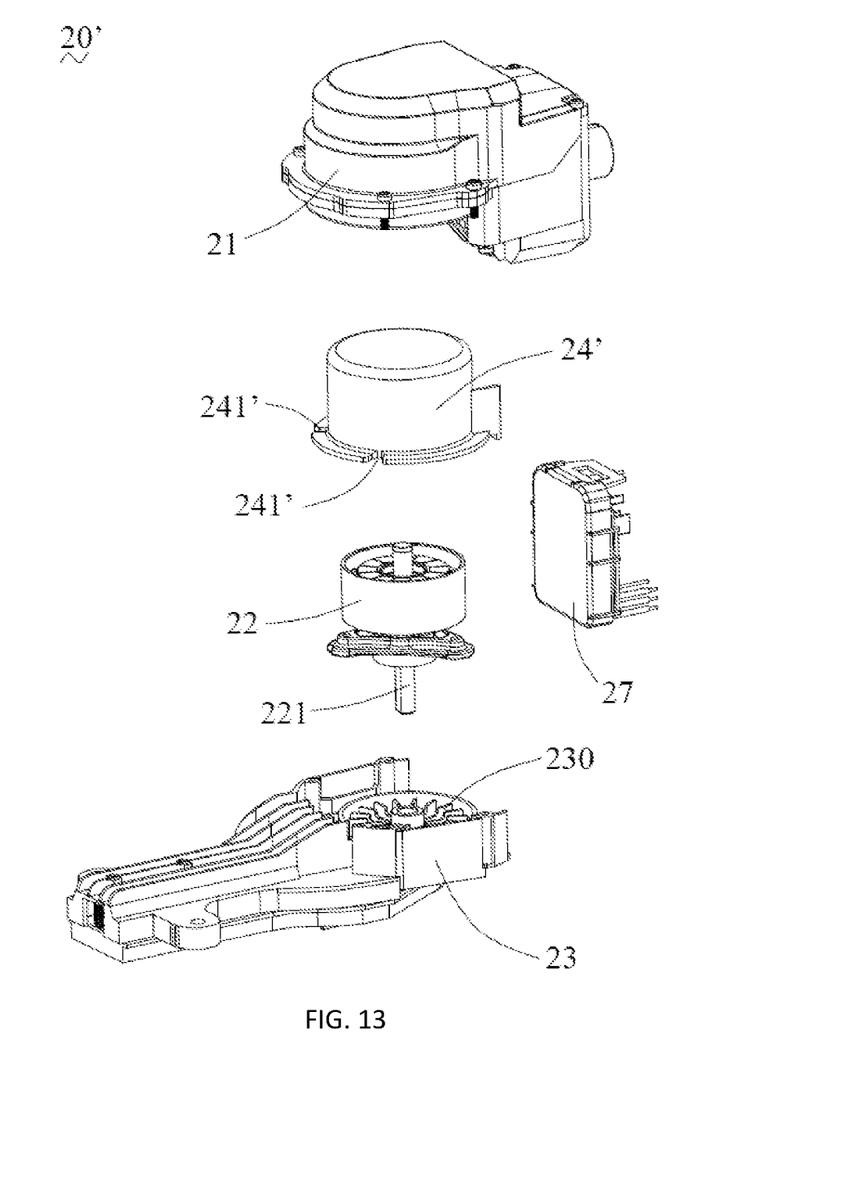
FIG. 13 is a partially exploded view of the power mechanism according to the second embodiment of the present invention.
Figure 14:
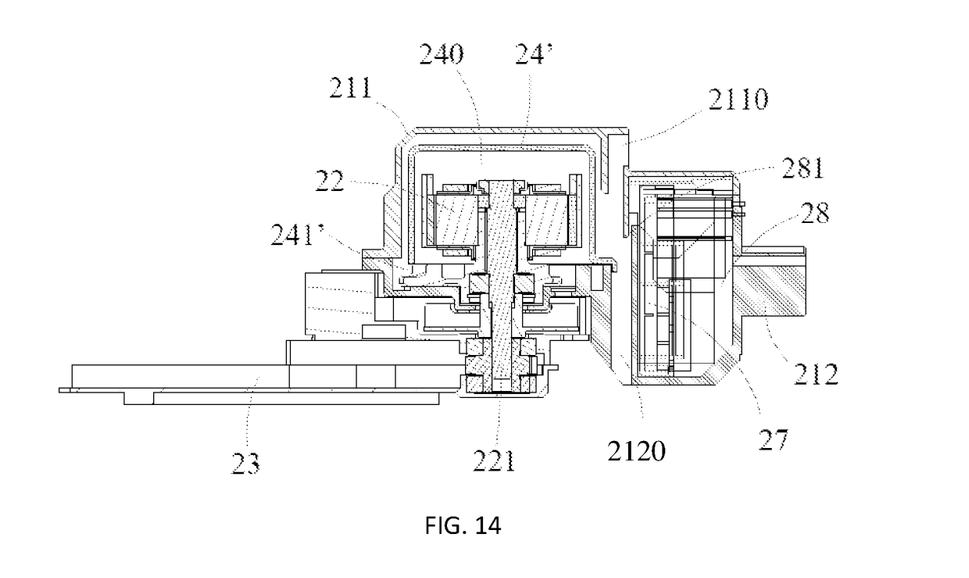
FIG. 14 is a cross-sectional view of the power mechanism.

FIG. 13 and FIG. 14 show the second embodiment of the hedge trimmer of the present invention. The structure of the hedge trimmer in the second embodiment is basically the same as that of the hedge trimmer 100 in the first embodiment, except for its power mechanism 20'. For the sake of brevity, only the power mechanism 20' will be described below.

The power mechanism 20' is basically similar to the power mechanism 20 in the first embodiment, and the power mechanism 20' includes a main housing 21, a motor 22, a power transmission assembly 23, an inner housing 24', a second fan 230, and a circuit board 27. Please note that, compared to the power mechanism 20 in the first embodiment, the power mechanism 20' eliminates the first fan 26, and the connection type of each element of the power mechanism 20' is the same as that of the power mechanism 20 in the first embodiment. Related contents can be referred to the first embodiment. Except that the structure of the inner housing 24' is slightly different, the structure of other elements is the same as that of the power mechanism 20 in the first embodiment. For easy understanding, except for the inner housing 24', other elements follow the reference numerals in the first embodiment.

The inner housing 24' in the second embodiment is similar to the inner housing 24 in the first embodiment, except that the top of the inner housing 24' is closed and a second opening 241' is arranged at the bottom. Preferably, multiple second openings 241' are arranged at the bottom of the inner housing 24'. After the outside air enters the top cover 211 of the main housing 21 through the first air inlet 2110 of the main housing 21, it flows between the inner housing 24' and the top cover 211, and then enters through the second openings 241' to the motor room 240 to cool the motor 22. In this embodiment, the second opening 241' is opened on the side of the inner housing 24' away from the first air inlet 2110.

The heat dissipation process of the power mechanism 20' of the hedge trimmer in the second embodiment can be summarized as below. When the second fan 230 connected to the output shaft 221 of the motor 22 rotates, it generates suction force and sucks in the external air from the first air inlet 2110 and the second air inlet 2120 into the top cover 211 and flows around the inner housing 24'. And then the air enters the motor room 240 through the second opening 241', and finally the air goes out through the bracket 212 of the main housing 21 and the power transmission assembly 23 to take away the heat in the motor room 240. The hedge trimmer in the second embodiment includes a first air inlet 2110 at the top of the main housing 21, and at the same time, the top of the inner housing 24' is closed, and the second opening 241 is arranged at the bottom of the inner housing 24'. Thus, the hedge trimmer in the second embodiment has a good heat dissipation, improved waterproof and dustproof effect. It can work in rainy and humid areas without affecting the performance of the whole machine.

Similar to the first embodiment, the top cover 211 and the bracket 212 also form a receiving cavity 28 for accommodating the circuit board 27, which can be waterproof and dustproof to protect the circuit board 27. The receiving cavity 28 comprises a gap 281 for the circuit board 27 to dissipate the heat from electronic components.

In summary, in the first embodiment, a first opening 241 is arranged at the top of the inner housing 24. In the second embodiment, the top of the inner housing 24' is closed, and the second opening 241' is arranged at the bottom of the inner housing 24'. Both embodiments can achieve the effects of heat dissipation, waterproofing and dustproofing, and can be used in rainy and humid areas without affecting the performance of the whole machine. In the above two embodiments, only two examples are exemplified, and openings arranged in other positions of the inner housing also belong to the protection scope of the present invention.

The above embodiment is only used to illustrate the technical solution of the present invention and are not limiting. Although the present invention has been described in detail with reference to the preferred embodiment, those skilled in the art should understand that the technical solution of the present invention can be modified or equivalently replaced without departing from the spirit and scope of the technical solution of the present invention.

What is claimed is:

1. A handheld power tool comprising:
   a handle assembly;
   a power mechanism connected with the handle assembly; and
   a working mechanism connected to the power mechanism;
   wherein the power mechanism comprises a main housing, an inner housing and a motor disposed in the inner housing, the main housing comprises a first air inlet at a side wall thereof, the inner housing comprises an opening, and wherein an airflow channel is located between the main housing and the inner housing, and in communication with the first air inlet, the opening and an inside of the inner housing;
   wherein the main housing comprises a top cover located above the motor, and wherein the first air inlet is disposed at the top of the top cover;
   wherein the inner housing is disposed below the top cover, wherein the top cover comprises an extension wall extending downward from the inner side of the top cover, and wherein the extension wall is arranged between the first air inlet and the inner housing.

2. The handheld power tool according to claim 1, wherein the opening is disposed at the top or the bottom of the inner housing.

3. The handheld power tool according to claim 1, wherein a first fan is disposed on the top of the motor, wherein the first fan is coaxially sleeved on an output shaft of the motor, and wherein the motor is an external rotor motor and the first fan is an axial fan.

4. The handheld power tool according to claim 1, wherein the main housing comprises a bracket disposed below the top cover, wherein a second air inlet is arranged at the bottom of the bracket, and wherein the second air inlet communicates with the first air inlet in an extending direction of an output shaft of the motor.

5. The handheld power tool according to claim 1, wherein the power mechanism comprises a circuit board electrically connected to the motor, and wherein the circuit board is arranged below the top cover and on the same side of the main housing as the first air inlet.

6. The handheld power tool according to claim 1, wherein the handheld power tool is a hedge trimmer or a chainsaw.

7. A handheld power tool comprising:
   a handle assembly;
   a power mechanism connected with the handle assembly; and
   a working mechanism connected to the power mechanism;
   wherein the power mechanism comprises a main housing, an inner housing and a motor disposed in the inner housing, the main housing comprises a first air inlet at a side wall thereof, the inner housing comprises an opening, and wherein an airflow channel is located between the main housing and the inner housing, and in communication with the first air inlet, the opening and an inside of the inner housing;
   wherein the main housing comprises a top cover located above the motor, and wherein the first air inlet is disposed at the top of the top cover;
   wherein the main housing comprises a bracket disposed below the top cover, wherein a second air inlet is arranged at the bottom of the bracket, and wherein the second air inlet communicates with the first air inlet in an extending direction of an output shaft of the motor,
   wherein the power mechanism comprises a power transmission assembly installed below the bracket, wherein the power transmission assembly comprises a bottom cover installed at the bottom of the bracket and a second fan received in the bottom cover, wherein the bottom cover comprises a blower chamber full surrounding the second fan, and wherein a heat dissipation channel is arranged at the bottom of the blower chamber and opens into the exterior of the main housing.

8. The handheld power tool according to claim 7, wherein the second fan is connected to the output shaft of the motor, wherein a ventilation hole is arranged at the bottom of the bracket for communicating the inner housing with the blower chamber.

9. The handheld power tool according to claim 8, wherein at least two heat dissipation fins are arranged on the side of the bottom cover close to the blade assembly, wherein a heat dissipation passage is arranged between two adjacent heat dissipation fins, wherein the blower chamber is fully surrounded by the at least two heat dissipation fins, and wherein one end of the heat dissipation passage communicates with the blower chamber and the other end of the heat dissipation passage communicates with the exterior of the main housing.

10. The handheld power tool according to claim 7, wherein the heat dissipation channel is arranged at an end of the bottom cover opposite to the blade assembly, and wherein a third air inlet is arranged at the bottom of the blower chamber.

11. The handheld power tool according to claim 10, wherein the heat dissipation channel extends in the width direction of the bottom cover, and wherein the third air inlet extends in the length direction of the bottom cover.

12. The handheld power tool according to claim 7, wherein the second fan is a centrifugal fan.

* * * * *